United States Patent [19]
Maurice

[11] Patent Number: 6,161,659
[45] Date of Patent: Dec. 19, 2000

[54] ELECTROMAGNETIC DISK BRAKE WITH RUBBER FRICTION DISK BRAKING SURFACE

[75] Inventor: Kevin L. Maurice, Bristol, Conn.

[73] Assignee: Inertia Dynamics, Inc., Collinsville, Conn.

[21] Appl. No.: 09/167,006

[22] Filed: Sep. 29, 1998

[51] Int. Cl.[7] .................................................. B60T 13/04
[52] U.S. Cl. ........................................... 188/171; 188/161
[58] Field of Search ................................... 188/161, 162, 188/164, 171, 173, 163

[56] References Cited

U.S. PATENT DOCUMENTS

| | | | |
|---|---|---|---|
| 3,908,802 | 9/1975 | Shimodaira et al. | 188/171 |
| 3,943,729 | 3/1976 | Dankel | 64/30 |
| 4,218,361 | 8/1980 | Searfoss et al. | 260/38 |
| 4,226,759 | 10/1980 | Chester | 260/38 |
| 4,515,251 | 5/1985 | Wruk | 188/171 |
| 5,083,643 | 1/1992 | Hummel et al. | 188/251 |
| 5,093,388 | 3/1992 | Siemon, Jr. et al. | 523/149 |
| 5,154,261 | 10/1992 | Tanaka et al. | 188/171 |
| 5,217,778 | 6/1993 | LaCasse | 428/64 |
| 5,368,138 | 11/1994 | Kuivamaki | 188/171 |
| 5,655,629 | 8/1997 | Takizawa et al. | 188/24 |

*Primary Examiner*—Douglas C. Butler
*Assistant Examiner*—Robert A. Siconolfi
*Attorney, Agent, or Firm*—Cummings & Lockwood

[57] ABSTRACT

An electromagnetic brake includes an improved friction disk that has at least one friction surface formed entirely from a rubber material such as a styrene butadiene rubber material. The rubber material 1) has a high coefficient of friction, 2) conforms to the shape of the mating braking surfaces, 3) is dimensionally stable so as not to unnecessarily widen the air gap of the brake when the brake is applied, and 4) exhibits acceptable wear characteristics. The rubber material also preferably does not exhibit a sharp reduction in coefficient of static friction when it is heated, e.g., due to friction from its mating surfaces and/or due to heat transfer from the electric motor or other braked element. The resultant brake is relatively light-weight, compact, and inexpensive. It is particularly well-suited for use as a static, park-and-hold brake for an electric motor or the like.

20 Claims, 3 Drawing Sheets

ELECTROMAGNETIC DISK BRAKE WITH RUBBER FRICTION DISK BRAKING SURFACE

BACKGROUND OF THE INVENTION

1. Field of the Invention

The invention relates to disk brakes and, more particularly, relates to an electromagnetic disk brake which has at least one friction disk having a braking surface formed entirely from a rubber material. The invention additionally relates to a friction disk usable in such a brake and to a motor braked by such a brake.

2. Discussion of the Related Art

Electromagnetic disk brakes are widely used in a variety of applications such as dynamic brakes for motor input shafts and/or output shafts and as static or "park-and-hold" brakes for motors and the like. A typical electromagnetic disk brake of this type includes a friction disk that is coupled with the shaft so as to be movable axially relative to the shaft but to be rotationally fixed relative to the shaft. In static braking applications, the friction disk is normally compressed between a pressure plate and an axially-movable clapper plate to provide the desired holding action, and brake release is effected by energizing the electromagnet to retract the clapper plate to allow the friction disk to rotate freely. In dynamic applications, the brake is applied while the shaft is rotating, either by energizing an electromagnetic actuator to overcome the force of a return spring or by de-energizing a normally-energized actuator to permit a compression spring to apply the brake. Whether used in static braking applications or dynamic braking applications, the braking surface of the typical friction disk of these brakes is formed from a composite material, often containing a brittle, hard, composite material.

Many electromagnetic disk brakes strive to maximize braking torque while minimizing size, weight, and power requirements. However, the typical composite material friction disk used in these brakes is less than ideal for these purposes for several reasons.

First, the typical brake disk material has a relatively low coefficient of static friction—usually on the order of about 0.3 to 0.5. Relatively strong springs must therefore be used to compress the disk between the clapper plate and the pressure plate with enough force to impose the required braking torque on the associated shaft. The requirement for strong springs, in turn, imposes a requirement for relatively large, high-powered magnetic coils to withdraw the clapper plate against the force of those springs.

Second, traditional composite friction materials have very little flexibility and, hence, cannot conform to the shape of the mating surfaces of the clapper plate and the pressure plate. Hence, in order to maximize available braking torque, it was necessary to machine the surfaces of the clapper plate and the pressure plate that mate with the friction disk to within 0.0005" to 0.0010" of a perfectly flat surface. Obtaining such a high degree of flatness usually requires that the mating surfaces of the clapper plate and the pressure plate be deburred, ground, and burnished. These machining requirements considerably increase the cost of the brake.

Other friction brake materials are known that lack one or more of the disadvantageous characteristics of traditional composite materials, but these other known materials exhibit disadvantages of their own.

For instance, the coefficient of static friction of some materials used in friction disks drops at least 30–50% when the friction disks are heated to temperatures of 100° C. or above. This is problematic because many brakes are heated to temperatures of up to 100° C. during braking due to heat from friction and/or heat transfer from the braked motor or other braked element.

OBJECTS AND SUMMARY OF THE INVENTION

It is therefore a principal object of the invention to provide an electromagnetic brake having a friction disk including a friction surface which is made from a material having a high coefficient of friction and which conforms to the surface of the mating braking elements.

Another object of the invention is to provide an electromagnetic brake which meets the first principal object and the friction surface of which is dimensionally stable so as not to distort significantly during braking.

Still another object of the invention is to provide an electromagnetic brake which meets the first principal object and the friction surface of which has acceptable wear characteristics.

In accordance with a first aspect of the invention, these objects are achieved by providing a friction disk which is attachable to a braked shaft so as to rotate about the axis of rotation of the shaft and to move axially relative to the axis of rotation of the shaft. The friction disk has first and second axially opposed friction surfaces, with at least the first friction surface being formed at least substantially entirely out of a rubber material. A clapper plate is fixed from rotation with respect to the axis and is movable axially between a) a first position in which an axial surface of the clapper plate does not apply pressure to the friction disk and b) a second position in which the axial surface of the clapper plate applies pressure to the first friction surface of the friction disk to apply the brake. An electromagnetic actuator drives the clapper plate to move from one of the first and second positions to the other of the first and second positions.

The rubber material, which preferably comprises a styrene butadiene rubber material, 1) has a coefficient of static friction of more than about 0.70, and preferably more than about 0.75, at 20° C.; and 2) has a hardness of less than about 100 Shore A and more than about 70 Shore A.

Preferably, the friction disk comprises 1) a rigid backing plate which is slidably mountable on the shaft and which has first and second opposed axial surfaces and 2) a friction ring which is attached to the first axial surface of the backing plate, which is formed entirely from the rubber material, and which forms the first friction surface of the friction disk.

The brake may be a static brake which selectively prevents rotation of the shaft when the shaft is stationary. In this case, the electromagnetic actuator drives the clapper plate to move from the second position to the first position, and the brake further comprises a spring which, in the absence of electromagnetic actuator energization, biases the clapper plate into the second position without significantly distorting the rubber material and without significantly increasing the width of the air gap of the brake.

Still another object of the invention is to provide an electromagnetic brake having a friction disk that meets the first principal object and that does not exhibit a sharp reduction in coefficient of static friction when it is heated.

In accordance with another aspect of the invention, this object is achieved by forming the braking surface of the friction disk from a rubber material having a coefficient of static friction which drops by less than about 30% when the rubber material is heated from approximately 20° C. to approximately 100° C.

A second principal object of the invention is achieved by providing a friction disk which, when used in an electromagnetic brake, meets the first principal object of the invention.

A third principal object of the invention is achieved by providing a combination of an electric motor and an electromagnetic brake meeting the first principal object of the invention.

A fourth principal object of the invention is to provide an improved method of braking a rotatable shaft using a brake that meets the first principal object of the invention.

In accordance with another aspect of the invention, this object is achieved by applying a brake by driving a clapper plate axially with respect to the shaft towards a friction disk which is fixed from rotation with respect to the shaft, thereby applying a braking torque to the shaft, and then releasing the brake by driving the clapper plate axially away from the friction disk. One of the applying step and the releasing step comprises energizing an electromagnetic actuator to drive the clapper plate axially relative to the friction disk. While an axial braking surface of the friction disk is made at least substantially entirely out of a rubber material, the brake is configured such that braking takes place without significant distortion of the rubber material and without significantly increasing the thickness of an air gap of the brake.

In one embodiment of the invention, the brake is used as a static, park-and-hold brake. In this case, the step of applying the brake comprises biasing the clapper plate towards the friction disk, and the step of releasing the brake comprises actuating the electromagnetic actuator to drive the clapper plate away from the friction disk.

These and other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Figure 1:
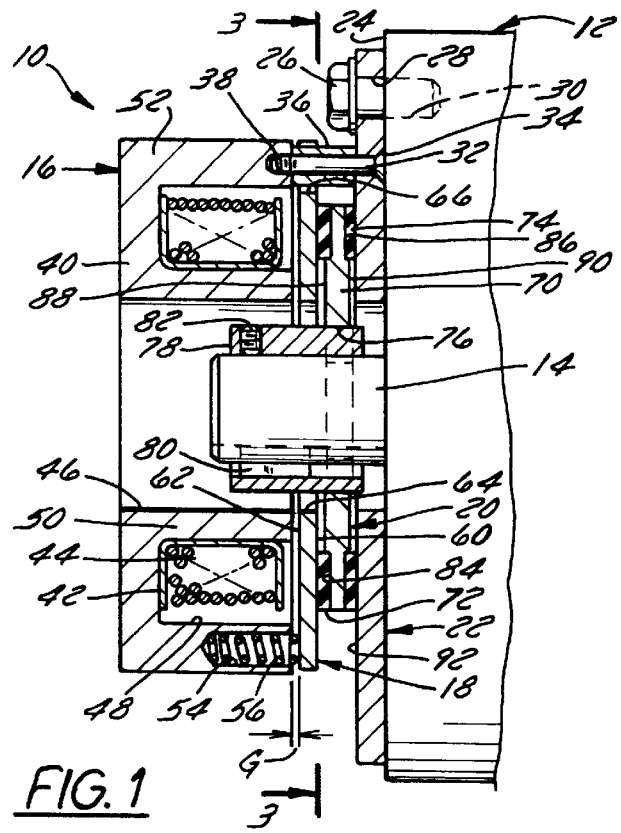
FIG. 1 is a partially-sectional, side elevation, partially fragmentary view of the combination of an electric motor and an electromagnetic brake constructed in accordance with the present invention, showing the brake in an applied position thereof.
Figure 3:
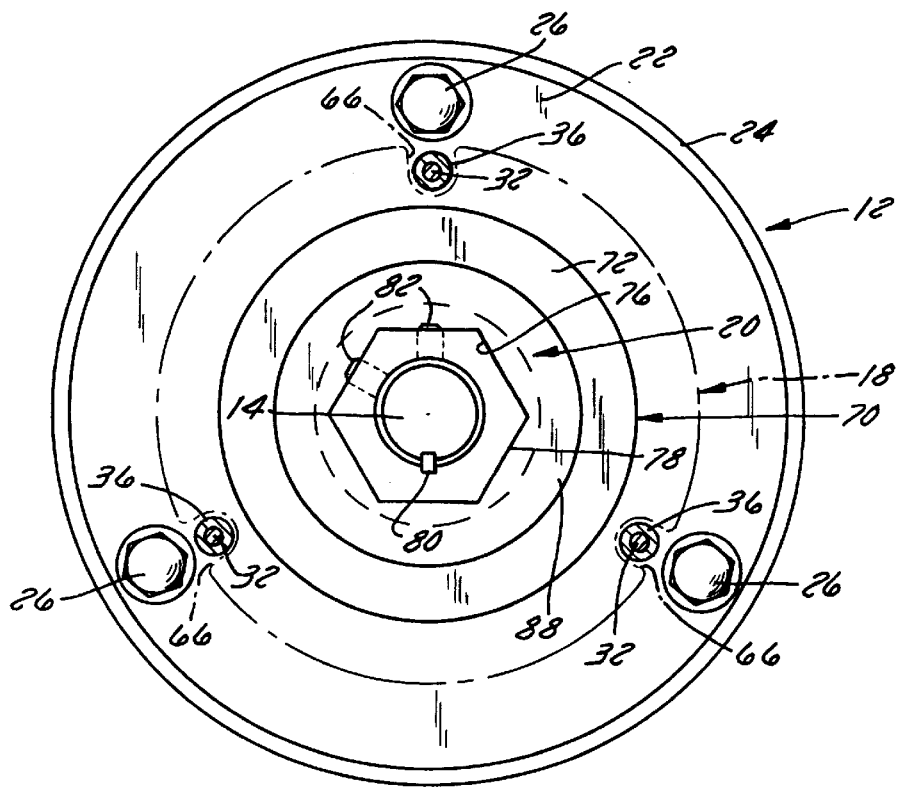
FIG. 3 is a sectional end elevation view of the brake, taken generally along the lines 3—3 in FIG. 1.

Pursuant to the invention, an electromagnetic brake includes an improved friction disk that has at least one friction surface formed entirely from a rubber material such as a styrene butadiene rubber material. The rubber material 1) has a high coefficient of friction, 2) conforms to the shape of the mating braking surfaces, 3) is dimensionally stable so as not to unnecessarily widen the air gap of the brake when the brake is applied, and 4) exhibits acceptable wear characteristics. The rubber material also preferably does not exhibit a sharp reduction in coefficient of static friction when it is heated, e.g., due to friction from its mating surfaces and/or due to heat transfer from the electric motor or other braked element. The resultant brake is relatively lightweight, compact, and inexpensive. It is particularly well-suited for use as a static, park-and-hold brake for an electric motor or the like.

2. Construction of Electromagnetic Brake

Referring now to the drawings, an electromagnetic brake 10 is illustrated that is capable of statically or dynamically braking virtually any shaft. In the illustrated embodiment, the brake is configured as a park-and-hold brake for a shaft 14 of a motor 12. The motor 12 may, for instance, comprise a one-to-five horsepower AC electric motor having a dynamic brake (not shown) that is separate from the brake 10. It should be understood that the brake 10 is usable in a wide variety of other static and dynamic braking applications as well.

Figure 2:
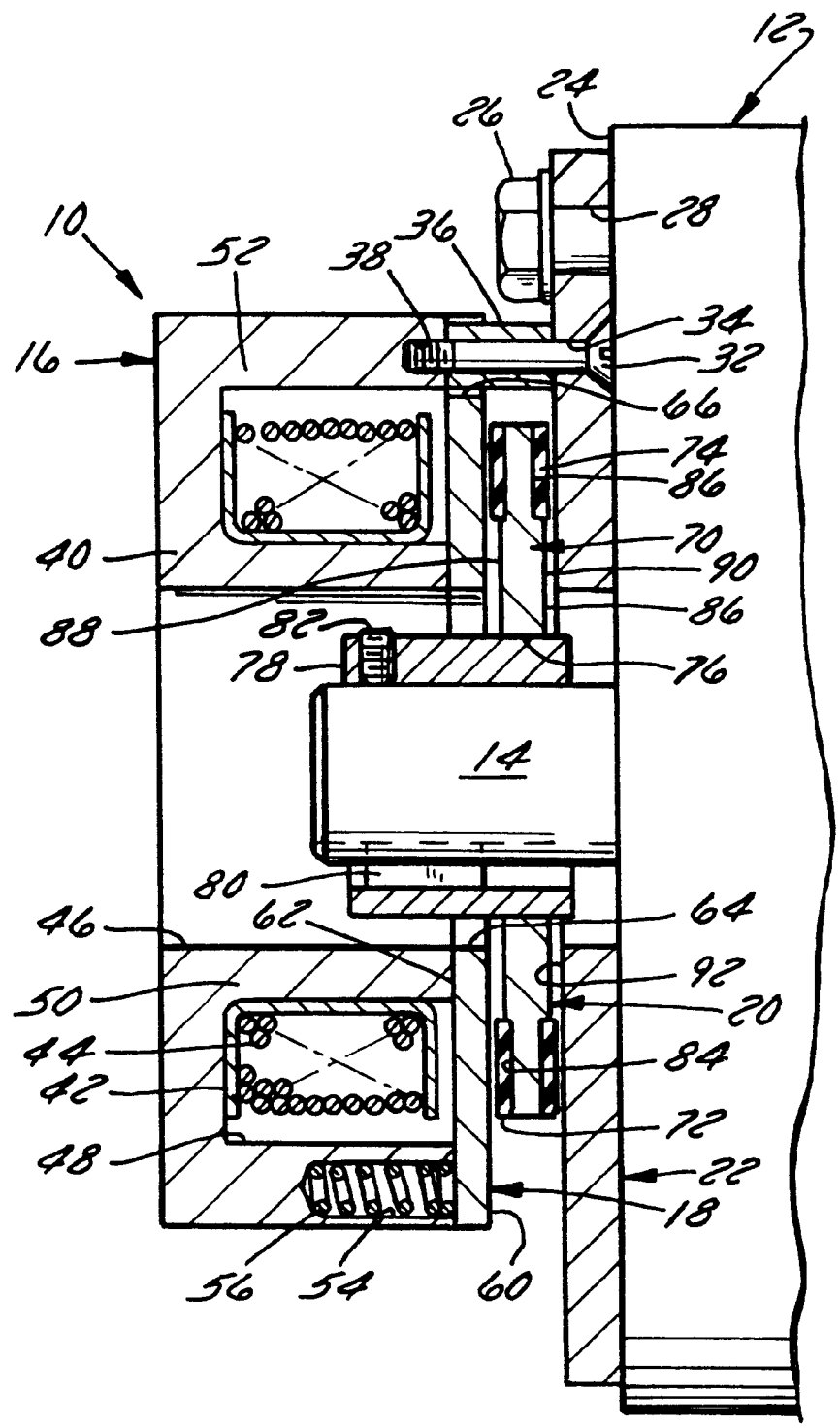
FIG. 2 corresponds to FIG. 1 and shows the brake in a released position thereof.
Figure 4:
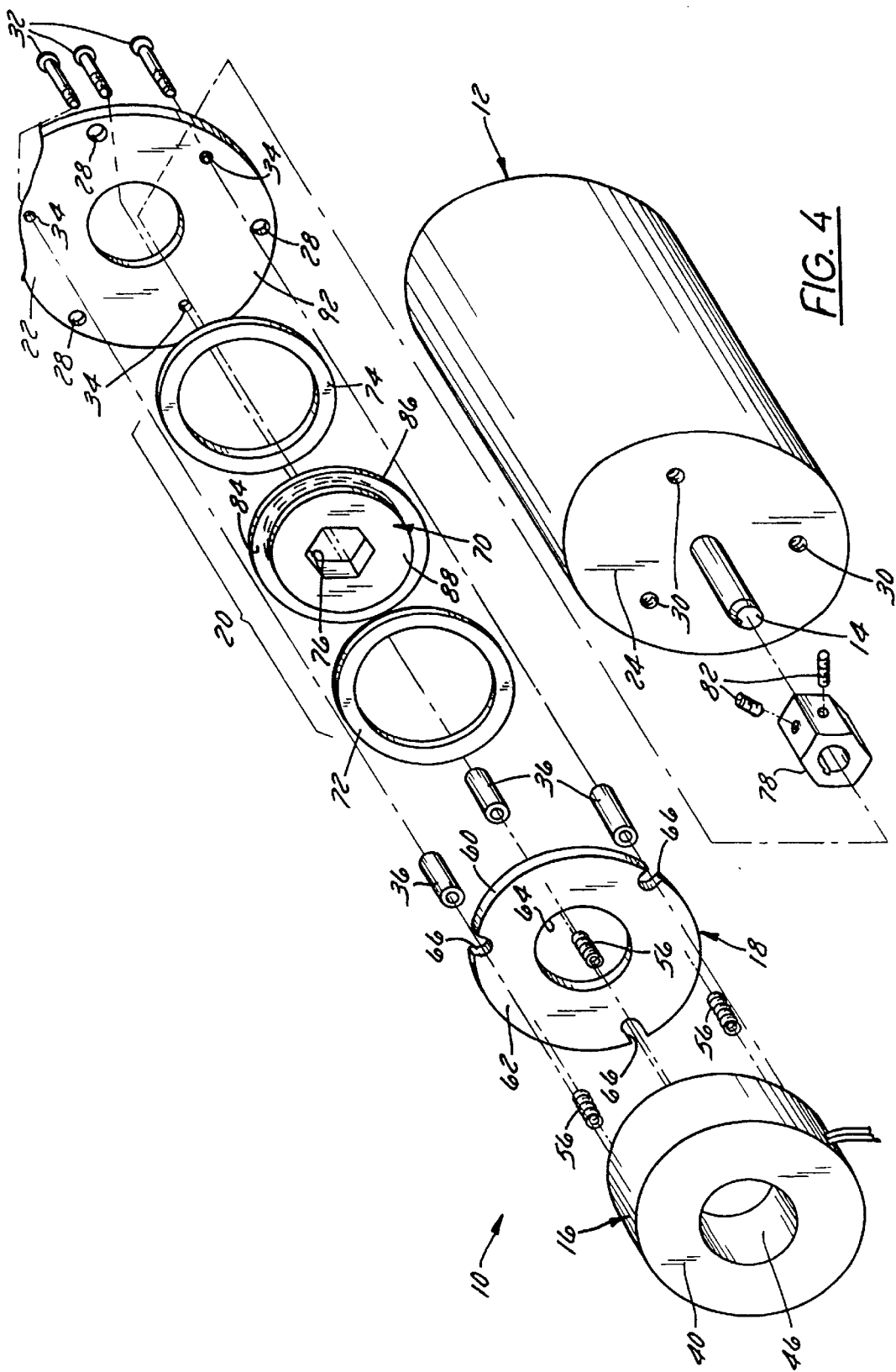
FIG. 4 is perspective view illustrating the motor and brake of FIGS. 1–3, illustrating the brake in an exploded perspective form.

Proceeding from left to right or from outer to inner ends in FIGS. 1 and 2, the brake 10 includes as its principal components a field assembly 16, a clapper plate 18, a friction disk 20, and a pressure plate 22. The pressure plate 22 is attached to an end bell 24 of the motor 12 by three evenly spaced bolts 26 passing through axial bores 28 in the pressure plate 22 and into threaded bores 30 tapped into the motor end bell 24. The pressure plate 22 also is attached to the remainder of the brake 10 by three cap screws 32 that extend through respective evenly spaced bores 34 in the pressure plate 22, through tubular standoffs 36 (detailed below), and into mating tapped bores 38 of the field assembly 16. Hence, the pressure plate 22 also serves as a mounting plate for mounting the electromagnetic brake 10 on the motor 12.

The brake 10 includes only a single friction disk 20 mounted on the shaft 14 by a hub 78 as discussed in more detail below. However, it should be understood that the invention is also applicable to brakes having multiple interleaved friction disks. In brakes of this type, all of the friction disks are axially movable with respect to the braked shaft. In this case, one or both friction surfaces of each friction disk would contact an axially movable, rotationally fixed separator plate rather than the clapper plate 18 or the pressure plate 22. The pressure plates could comprise either conventional rigid plates or friction disks of the inventive type. However, the clapper plate 18 and pressure plate 22 would still be at least indirectly responsible for applying pressure to all of the friction disks.

In the illustrated embodiment, the field assembly 16 includes a field cup 40, a bobbin 42, and an electromagnetic coil 44. The field cup 40 is formed from steel or another ferromagnetic material and has a bore 46 formed axially therethrough to receive the end of the shaft 14. A relatively deep annular groove 48 is formed in the inner axial face of the sealing cup 40 for receiving the bobbin 42 and coil 44. The annular groove 48 is flanked by inner and outer annular axial legs 50 and 52. A first set of three equally spaced axial bores 54 (only one of which is shown) is formed in the inner axial face of the outer leg 52 for receiving compression springs 56. Additional threaded bores 38 are tapped into the inner face of the outer leg 52 for receiving the cap screws 32 as described above.

The clapper plate 18 is rotationally fixed but is movable axially through an air gap G between a brake applied position in which it compresses the friction disk 20 and a brake released position in which it abuts the field cup 40. The clapper plate 18 comprises an annular plate made from a ferromagnetic material such a low carbon steel. Inner and outer axial surfaces 60 and 62 of the clapper plate 18 face the friction disk 20 and the field cup 16, respectively, such that the springs 56 abut the outer axial surface 62 to force the clapper plate 18 towards the friction disk 20. The clapper plate 18 also has a central aperture 64 formed therethrough for passage of the shaft 14. Three equally-spaced scallops 66 are formed in the outer peripheral surface of the plate 18 for receiving the standoffs 36. Because the standoffs 36 are held in place by the cap screws 32 as described above, the standoffs 36 prevent the clapper plate 18 from rotating relative to the shaft 14 while permitting the clapper plate 18 to move axially relative to the shaft 14. The standoffs 36 also center the clapper plate 18 relative the axis of rotation of the shaft 14.

The friction disk 20 is specially designed to have at least one braking surface, and preferably both braking surfaces, formed entirely from a rubber material. In the illustrated embodiment, the friction disk 20 includes 1) a rigid backing plate 70 and 2) inner and outer friction rings 72 and 74. The backing plate 70 is formed from a rigid material—preferably aluminum. The backing plate 70 is mounted on the shaft 14 so as to be slidable axially with respect to the shaft 14 but so as to be rotationally fixed with respect to the shaft 14. Towards these ends, a bore 76 is formed axially through the center of the backing plate 70 and has a non-circular (preferably hexagonal) shape complementing the shape of a hub 78 on which the backing plate 70 is slidably mounted. The hub 78, in turn, is keyed to the shaft 14 by a key 80. Excessive sliding motion of the friction disk 20 relative to the shaft 14 is prevented by set screws 82 located at the outer end of the hub 78.

First and second peripheral grooves 84 and 86 are formed in the outer radial end portions of opposed inner and outer axial surfaces 88 and 90 of the backing plate 70. The first and second friction rings 72 and 74 are mounted in the grooves 84 and 86, preferably by adhesion using a suitable epoxy or the like. As best seen in FIGS. 1 and 2, the rings 72 and 74 are noticeably thicker than the grooves 84 and 86 so as to extend axially beyond axial faces 88 and 90 of the backplate 70. Accordingly, in use, frictional engagement between the clapper plate 18 and the friction disk 20 occurs only between the friction ring 72 and a corresponding annular portion of the inner axial surface 60 of the clapper plate 18, and frictional engagement between the pressure plate 22 and the friction disk 20 occurs only between the friction ring 74 and a corresponding annular portion of an outer axial surface 92 of the pressure plate 22. Although the illustrated embodiment employs a single annular ring 72 or 74 on each side of the friction disk 20, multiple concentric annular or segmented rings could be used as well. It is also conceivable that only one braking surface of the friction disk 20 could be made from a rubber material, in which case the opposite braking surface could be made from a more conventional material.

3. Composition of Friction Rings

The selection of a suitable material for the friction rings 72 and 74 proved instrumental to the success of the invention. A suitable material is one which 1) exhibits a relatively high coefficient of friction, and 2) strikes an acceptable balance between surface conformance, dimensional stability, and wear. Preferably, the rubber material should have the following properties:

a. Coefficient of Static Friction:

The preferred material should have a coefficient of static friction which is significantly higher than that exhibited by traditional friction materials, which typically have a coefficient of static friction of about 0.3 to 0.5 at 20° C. A high-friction material is desirable because the braking torque imposed by a friction disk is a product of the application force and the coefficient of friction. In the preferred embodiment and other park-and-hold brakes, the application force is dictated by the strength of the springs. Therefore, in a brake of given dimensions, weaker springs 56 may be used with materials having higher coefficients of friction to obtain the same braking torque. Correspondingly smaller and less powerful coils can then be used to withdraw the clapper plate 18 against the force of those relatively weak springs 56. A coefficient of static friction above 0.70 at 20° C. is preferred.

b. Surface Conformance

In traditional disk brakes, the surfaces of the clapper plate and the pressure plate that mate with the friction disk must have an out-of-roundness of less than 0.0005" to 0.001" under loads imposed in brakes of this type to achieve 90% of maximum torque level under designated braking conditions. These surfaces therefore must usually be deburred, ground, and burnished. A material that could accommodate mating surface out-of-flatness of more than 0.001" is preferred because it would eliminate the need to grind and burnish the mating surfaces. The material also should not gall or scour the mating surfaces. A material having a hardness of less than 100 Shore A is acceptable for these purposes.

C. Dimensional Stability

While the material should flexible enough to conform to mating surfaces that are relatively rough or out-of-round, it should not be so compressible as to distort significantly upon brake actuation. Excess friction ring distortion leads to an increase in the width of the air gap G. This is undesirable because the power requirement of the brake 10 increases with the width of the air gap G because the coil 44 must act on the clapper 18 through a greater distance. It is preferred that each friction ring 72 and 74 distorts less than 0.003" upon brake application. A material that has a hardness of over about 70 Shore A is acceptable for these purposes.

d. Thermal Stability

Many rubbers exhibit a dramatic reduction in coefficient of static friction as they are heated from room temperature of about 20° C. to an operational temperature of 100° C. These materials are poorly-suited for dynamic braking applications and/or other braking applications in which the friction material is likely to be heated during braking. A material that has relatively high thermal stability and that exhibits a reduction in coefficient of static friction of less than about 30% when it is heated from 20° C. to 100° C. is preferred.

e. Wear Capability

The preferred material exhibits at least the first three and preferably all four advantages discussed above while still exhibiting acceptable wear characteristics. Preferably, a braking surface formed from this material should have a wear factor of over $4.00 \times 10^{-9}$ lb.in/in$^3$ f. Preferred Material While a variety of neoprene rubbers and butyl rubbers may be available that meet at least the minimum threshold of each of the above-described characteristics, the currently-preferred material is a styrene butadiene rubber material that is commercially available from Girard Rubber Corp. of Elmsford, N.Y. under Girard's designation ID100 compound #4. This material has an ASTM 2000 specification number of M2 BA 906 C12 F17 Z1 (where Z1 designates no oily residure). It exhibits a coefficient of static friction of at least 0.70 at 20° C. and is relatively thermally stable, usually exhibiting a reduction of coefficient of static friction of less than 30% after repeated heating cycles to above 100° C. It has a hardness of between about 85 Shore A and 95 Shore A. It can accommodate mating surface out-of-flatness of at least 0.003", and sometimes up to 0.005" and even more, while still achieving 90% of its maximum torque level. It is also sufficiently incompressible that, in operation, the friction rings 72 and 74 each distort less than about 0.002", and actually less than about 0.001". It also wears well, having a wear factor of $4.28 \times 10^{-9}$ lb.in/in$^3$.

4. Operation of Electromagnetic Brake

In use, whenever the coil 44 is not energized, the springs 56 force the clapper plate 18 away from the field cup 40 to compress the friction rings 72 and 74 of the friction disk 20 between the inner axial surface 60 of the clapper plate 18 and the outer axial surface 92 of the pressure plate 22 as seen in FIG. 1, thereby applying the brake 10 and preventing the shaft 14 from rotating. The use of the above-described rubber material as the friction surfaces of the friction disk 20 assures maximum torque imposition even at elevated temperatures of 100° C. Near-maximum torque capacity is maintained even under conditions in which the mating surfaces 60 and 92 of the clapper plate 18 and pressure plate 22 exhibit roughness and/or out of flatness of 0.003" or more. The mating surfaces 60 and 62 of the clapper plate 18 and pressure plate 22 therefore need not be burnished nor even necessarily ground for optimal braking. Moreover, the surfaces 60 and 62 not only are not galled or scoured in operation, but actually are slightly polished.

To release the brake 10, the coil 44 is energized to pull the clapper plate 18 axially away from the friction disk 20 against the force of the springs 56 to a position in which the clapper plate 18 abuts the field cup 40 as seen in FIG. 2. The friction disk 20 is now free to rotate with the shaft 14 without interference from either the clapper plate 18 or the pressure plate 22. Brake release requires only a relatively small amount of power because 1) the relatively weak springs 56, usable due to the high coefficient of friction of the friction rings 72 and 74, can be compressed relatively easily and, 2) the air gap G through which the coils 44 must act to withdraw the clapper plate 18 can be minimized due to the relatively low compressibility of the friction rings 72 and 74. As a result, the number of amp-turns required for the coil 44 can be reduced, as well as the amount of steel in the magnetic circuit. These reductions yield a reduction in weight as well as in the overall length of the brake 10.

Many changes and modifications may be made to the present invention without departing from the spirit thereof. The scope of some of these changes, such as the applicability of the invention to multiple disk-brakes and to a variety of brakes other than a static, park-and-hold brake, are discussed above. The scope of other changes will become apparent below from the appended claims.

I claim:

1. An electromagnetic brake for braking a shaft which is rotatable about an axis of rotation, said brake comprising:

(A) a friction disk which is attachable to the shaft so as to rotate about the axis of rotation of the shaft and to move axially relative to the axis of rotation of the shaft, said friction disk having first and second axially opposed friction surfaces, wherein at least said first friction surface is formed at least substantially entirely out of a rubber material wherein the coefficient of static friction of said rubber material drops by less than 30% when said rubber material is heated from approximately 20° C. to approximately 100° C.;

(B) a clapper plate which 1) is fixed from rotation with respect to the axis, and 2) is movable axially between a) a first position in which an axial surface of said clapper plate does not apply pressure to said friction disk and b) a second position in which said axial surface of said clapper plate applies pressure to said first friction surface of said friction disk to apply said brake; and (C) an electromagnetic actuator which, when energized, drives said clapper plate to move from one of said first and second positions to the other of said first and second positions.

2. A brake as defined in claim 1, wherein said brake is a static brake which selectively prevents rotation of the shaft when the shaft is stationary, wherein said electromagnetic actuator drives said clapper plate to move from said second position to said first position, and wherein said brake further comprises a spring which, in the absence of electromagnetic actuator energization, biases said clapper plate into said second position without significantly distorting said rubber material and without significantly increasing the width of the air gap of said brake.

3. A brake as defined in claim 1, wherein said rubber material is a styrene butadiene rubber material.

4. A brake as defined in claim 1, wherein said rubber material has a coefficient of static friction of more than about 0.70 at 20° C.

5. A brake as defined in claim 4, wherein said rubber material has a coefficient of static friction of at least 0.75 at 20° C.

6. A brake as defined in claim 1, wherein said rubber material has a hardness of less than about 100 Shore A.

7. A brake as defined in claim 6, wherein said rubber material has a hardness of more than about 70 Shore A.

8. A brake as defined in claim 1, wherein said friction disk comprises 1) a rigid backing plate which is slidably mountable on the shaft and which has first and second opposed axial surfaces and 2) a friction ring which is attached to said first axial surface of said backing plate, which is formed entirely from said rubber material, and which forms said first friction surface of said friction disk.

9. A brake as defined in claim 8, wherein said friction ring comprises a first friction ring, and wherein said friction disk further comprises a second friction ring which is attached to said second axial surface of said backing plate, which is formed entirely from said rubber material, and which forms said second friction surface of said friction disk, and further comprising a rotationally-fixed pressure plate having an axial surface which applies pressure to said second friction ring when said clapper plate moves from said first position to said second position and drives said friction disk into engagement with said rotationally-fixed member.

10. A brake as defined in claim 9, wherein said pressure plate is directly attachable to a support.

11. A static brake for selectively preventing rotation of a stationary shaft which is rotatable about an axis of rotation, said brake comprising:

(A) a friction disk which is attachable to the shaft so as to rotate about the axis of rotation of the shaft and to move axially relative to the axis of rotation of the shaft, said friction disk comprising
  (1) a rigid backing plate which is slidably mountable on the shaft and which has first and second opposed axial surfaces, and
  (2) first and second friction rings which are attached to said first and second axial surfaces of said backing plate, respectively, wherein each of said first and second friction rings is formed at least substantially entirely out of a styrene butadiene rubber material;
(B) a ferromagnetic clapper plate which 1) is located axially adjacent to said first friction ring, 2) is fixed from rotation with respect to the axis of rotation of the shaft, and 3) is movable axially between a) a first position in which a metal axial surface of said clapper plate is spaced axially from said friction disk and b) a second position in which said metal axial surface of said clapper plate engages said first friction ring;
(C) a rotationally-fixed pressure plate having an axial surface which is engaged by said second friction ring when said clapper plate moves from said first position to said second position and drives said friction disk into engagement with said pressure plate;
(D) an electromagnetic coil which, when energized, drives said clapper plate to move from said second position to said first position; and
(E) a spring which, in the absence of electromagnetic coil energization, biases said clapper plate into said second position without significantly distorting said rubber material and without significantly increasing the width of an air gap of said brake.

12. A static brake for selectively preventing rotation of a stationary shaft which is rotatable about an axis of rotation, said brake comprising:
(A) a friction disk which is attachable to the shaft so as to rotate about the axis of rotation of the shaft and to move axially relative to the axis of rotation of the shaft, said friction disk comprising
  (1) a rigid backing plate which is slidably mountable on the shaft and which has first and second opposed axial surfaces having grooves formed therein, and
  (2) first and second friction rings which are mounted in said grooves of said first and second axial surfaces of said backing plate, respectively, wherein each of said first and second friction rings is formed at least substantially entirely out of a styrene butadiene rubber material which has
    (a) a coefficient of static friction which is more than about 0.70 at 20° C. and which drops by less than 30% when said rubber material is heated from approximately 20° C. to approximately 100° C., and
    (b) a hardness of between about 85 Shore A and about 95 Shore A;
(B) a ferromagnetic clapper plate which 1) is located axially adjacent to said first friction ring, 2) is fixed from rotation, and 3) is movable axially between a) a first position in which a metal axial surface of said clapper plate is spaced axially from said friction disk and b) a second position in which said metal axial surface of said clapper plate engages said first friction ring;
(C) a rotationally-fixed pressure plate 1) which has an axial surface which is engaged by said second friction ring when said clapper plate moves from said first position to said second position and drives said second friction ring into engagement with said pressure plate and 2) via which said brake is directly attachable to a support;
(D) an electromagnetic coil which, when energized, drives said clapper plate to move from said second position to said first position; and
(E) a spring which, in the absence of electromagnetic coil energization, biases said clapper plate into said second position without significantly distorting said rubber material and without significantly increasing the thickness of an air gap of said brake.

13. In combination:
(A) an electric motor having a shaft which is rotatable about an axis; and
(B) a brake for selectively braking said shaft, said brake including
  (1) a friction disk which is attachable to said shaft so as to rotate about the axis of rotation of said shaft and to move axially relative to the axis of rotation of said shaft, said friction disk comprising
    (a) a metal backing plate which is slidably mountable on said shaft and which has first and second opposed axial surfaces, and
    (b) first and second friction rings which are attached to said first and second axial surfaces of said backing plate, respectively, wherein each of said first and second friction rings is formed at least substantially entirely out of a rubber material wherein said rubber material comprises a styrene butadiene rubber material which has a coefficient of static friction which is more than about 0.70 at 20° C. and which drops by less than 30% when said rubber material is heated from approximately 20° C. to approximately 100° C., and a hardness of between about 70 Shore A and about 100 Shore A,
  (2) a clapper plate which a) is fixed from rotation with respect to said axis, and b) is movable axially between i) a first position in which an axial surface of said clapper plate does not apply pressure to said friction disk and ii) a second position in which said axial surface of said clapper plate applies pressure to said first friction surface of said friction disk to apply said brake;
  (3) a rotationally-fixed pressure plate having an axial surface which is engaged by said second friction ring when said clapper plate moves from said first position to said second position and drives said second friction ring towards said pressure plate; and
  (4) an electromagnetic actuator which, when energized, drives said clapper plate to move from one of said first and second positions to the other of said first and second positions.

14. A combination as defined in claim 13, wherein said pressure plate is directly mounted on said motor.

15. A friction disk usable with an electromagnetic brake for braking a shaft which is rotatable about an axis of rotation, the brake including A) a clapper plate which 1) is fixed from rotation with respect to the axis of rotation of the shaft, and 2) is movable axially between a first, brake-applied position and a second, brake-released position, and B) an electromagnetic actuator which, when energized, drives the clapper plate to move from one of said first and second positions to the other of said first and second positions, said friction disk being attachable to the shaft so as to rotate about the axis of rotation of the shaft and to move axially relative to the axis of rotation of the shaft, said friction disk comprising:

first and second opposed friction surfaces extending substantially perpendicularly to the axis, wherein at least said first friction surface is formed at least substantially entirely out of a rubber material and is compressed by the clapper plate when the clapper plate is in the first position thereof wherein said rubber material has 1) a coefficient of static friction which is more than about 0.70 at 20° C., and 2) a hardness of between about 70 Shore A and about 100 Shore A.

16. A friction disk as defined in claim 15, wherein said rubber material has a coefficient of static friction which drops by less than 30% when said rubber material is heated from approximately 20° C. to approximately 100° C.

17. A friction disk as defined in claim 15, wherein said rubber material is a styrene butadiene rubber material.

18. A method of braking a rotatable shaft, comprising:

(A) applying a brake by driving a clapper plate axially with respect to said shaft towards a friction disk which is fixed from rotation with respect to said shaft, thereby applying a braking torque to said shaft; and then (B) releasing said brake by driving said clapper plate axially away from said friction disk, wherein one of the applying step and the releasing step comprises energizing an electromagnetic actuator to drive said clapper plate axially relative to said friction disk, wherein an axial braking surface of said friction disk is made at least substantially entirely out of a rubber material, and wherein braking takes place without significant distortion and without significant wear of said rubber material and without significantly increasing the thickness of an air gap of said brake.

19. A method as defined in claim 18, wherein the step of applying said brake comprises biasing said clapper plate towards said friction disk, and wherein the step of releasing said brake comprises energizing said electromagnetic actuator to drive said clapper plate away from said friction disk.

20. A method as defined in claim 18, wherein, during the braking step, said rubber material is heated from approximately 20° C. to approximately 100° C. and exhibits a drop in coefficient of static friction of less than 30%.

* * * * *